(12) United States Patent
Kang

(10) Patent No.: US 8,789,270 B2
(45) Date of Patent: Jul. 29, 2014

(54) SYSTEM FOR MANUFACTURING SIDE PANEL OF VEHICLE

(75) Inventor: Se Kyu Kang, Gyunggi-Do (KR)

(73) Assignee: Hyundai Motor Company, Seoul (KR)

( * ) Notice: Subject to any disclaimer, the term of this patent is extended or adjusted under 35 U.S.C. 154(b) by 771 days.

(21) Appl. No.: 13/079,650

(22) Filed: Apr. 4, 2011

(65) Prior Publication Data

US 2012/0110838 A1 May 10, 2012

(30) Foreign Application Priority Data

Nov. 9, 2010 (KR) ........................ 10-2010-0111131

(51) Int. Cl.
*B23P 19/00* (2006.01)
*B21D 53/88* (2006.01)
*B23K 37/00* (2006.01)
*B62D 65/18* (2006.01)

(52) U.S. Cl.
USPC ................ 29/824; 29/822; 29/823; 29/897.2; 29/783; 29/784; 29/799; 198/346.2; 198/465.1; 228/43; 228/47.1

(58) Field of Classification Search
CPC .... B23P 21/00; B23P 21/004; B23P 2700/50; B23P 19/04; B23Q 7/04; B23Q 7/048; B25B 11/02; B25B 27/14; B21D 53/88; B62D 65/00; B62D 65/02; B62D 65/022; B62D 65/024; B62D 65/026; B62D 65/028; B62D 65/06; B62D 65/18; B65G 35/06; B65G 35/063; B65G 17/326; B65G 2201/0294; B65G 17/002; B65G 17/005; B65G 17/007
USPC .......... 29/822, 823, 824, 897.2, 281.5, 281.6, 29/430; 198/465.1, 465.2, 465.3, 346.2; 228/43, 47.1

See application file for complete search history.

(56) References Cited

U.S. PATENT DOCUMENTS

| | | | |
|---|---|---|---|
| 4,767,046 A * | 8/1988 | Kumagai et al. ................ | 228/4.1 |
| 6,344,629 B1 * | 2/2002 | Kato et al. ..................... | 219/148 |
| 8,291,829 B1 * | 10/2012 | Dunlavy et al. ................ | 104/288 |
| 8,348,133 B2 * | 1/2013 | Jeong .............................. | 228/43 |
| 2009/0272723 A1 * | 11/2009 | Jeong ........................ | 219/121.63 |
| 2009/0279992 A1 * | 11/2009 | Spangler et al. .............. | 414/562 |
| 2013/0056523 A1 * | 3/2013 | Jeong .............................. | 228/43 |

FOREIGN PATENT DOCUMENTS

| | | |
|---|---|---|
| EP | 1 918 182 A1 | 5/2008 |
| JP | 2005-161520 A | 6/2005 |
| JP | 2006-27424 A | 2/2006 |
| JP | 2009-78331 A | 4/2009 |

(Continued)

*Primary Examiner* — Sarang Afzali
(74) *Attorney, Agent, or Firm* — Morgan, Lewis & Bockius LLP

(57) ABSTRACT

A system for manufacturing a side panel of a vehicle, the system including upper running rails and lower running rails to provide a movement path of a cart, the cart having a support frame, a transfer roller, and a friction bar provided at a bottom surface of the support frame, wherein the side panel may be mounted on the cart and the cart moves selectively along the upper running rails and the lower running rails, at least a friction drive unit and at least a friction wheel disposed along the upper and lower running rails wherein the at least a friction drive selectively rotates the at least a friction wheel to move the cart by selectively engaging at least one of the friction wheels with the friction bar of the cart, and an external unit supporting an edge portion of the side panel during key welding process.

7 Claims, 8 Drawing Sheets

(56) References Cited

FOREIGN PATENT DOCUMENTS

| KR | 10-2003-0006285 A | 1/2003 |
| KR | 2003-0006285 A | 1/2003 |
| KR | 10-0569234 B1 | 4/2006 |
| KR | 10-0811629 B1 | 3/2008 |
| KR | 10-2009-0105759 A | 10/2009 |

\* cited by examiner

US 8,789,270 B2

SYSTEM FOR MANUFACTURING SIDE PANEL OF VEHICLE

CROSS-REFERENCE TO RELATED APPLICATION

The present application claims priority to Korean Patent Application No. 10-2010-0111131 filed Nov. 9, 2010, the entire contents of which is incorporated herein for all purposes by this reference.

BACKGROUND OF THE INVENTION

1. Field of the Invention

The present disclosure relates to a system for manufacturing a side panel of a vehicle. In particular, it relates to a system for manufacturing a side panel of a vehicle, in which the side panel is fixed using an external unit during key welding to cope with various types of carts for various vehicle models and the cart is driven in a frictional contact manner to reduce the manufacturing cost and installation space.

2. Description of-Related Art

Vehicle body panels for constituting a vehicle body are formed by pressing and conveyed to a vehicle body assembly line to be assembled into a vehicle body. Then, exterior panels such as doors, trunk lids, hoods, fenders, etc. are mounted on the assembled vehicle body and then subjected to a painting process.

Next, various components such as engines, transmissions, interior/exterior parts, etc. are assembled in a trim line, thus producing a complete vehicle.

FIG. 1 shows a conventional system for manufacturing a vehicle body panel, which generally comprises a linear motor 1 for providing a driving force for driving a cart 2, the cart 2, on which the vehicle body panel is placed and fixed, transferred to each process, a turntable 3 rotatably disposed between a welding robot 4 and an unloading robot 5, and the welding robot 4 for welding the vehicle body panel placed on the cart 2, and the unloading robot 5 for unloading the welded vehicle body panel and transferring it to the next process.

A plurality of linear motors 1 are installed between running rails, on which the cart 2 moves, to move the cart 2 in a non-contact manner.

Here, each of the linear motors 1 is controlled by an inverter to drive the cart 2 and, for this purpose, a gap between the cart 2 and the linear motors 1 should be maintained constant.

Moreover, a stopper 6 is provided to allow the cart 2 to be stopped at a desired position when the cart 2 is transferred to each process, thus controlling the position of the cart 2.

The conventional system moves the cart 2 in a non-contact manner using the linear motors 1, rotates the cart 2 using the turntable 3 in a welding process, unloads the welded vehicle body panel using the unloading robot 5, and transfers the vehicle body panel to the next process.

The operation of the above-described system will now be described.

In process A, the vehicle body panel is loaded on the cart 2, and the cart 2 is driven by the linear motors 1 and transferred to process B.

In process B, the cart 2 is rotated 180 degrees by the turntable 3 and transferred to process C, the vehicle body panel placed and fixed on the cart 2 is welded by the welding robot 4 in process C, the cart 2 is rotated to its original position by the turntable 3 and returned to process B, and the panel is unloaded by the unloading robot 5.

In process D, the cart 2 stands by the next loading of the vehicle body panel and moves to process A, and the panel is loaded on the cart 2.

The cart 2, from which the panel is unloaded in process B, is transferred to the process D to stands by the next loading of the vehicle body panel.

However, the conventional linear motors 1 are arranged along the running rails to move the cart 2, and thus the number of linear motors 2 is very large, which results in an increase in cost. Moreover, the capacity of the inverter for controlling the linear motor 1 is increased, which results in an increase in the manufacturing cost. Further, the size of its control panel is also increased, and thus the installation space is increased, thus being not advantageous in terms of layout.

Moreover, since the linear motor 1 drives the cart 2 in a non-contact manner, errors occur frequently when the moving speed of the cart 2 is controlled, and the manufacturing and assembling costs are increased to maintain the gap between the linear motors 1 and the cart 2.

Furthermore, every time when a new vehicle model is developed, some processes should be added to the production line, which is limited in terms of the management of the system. In addition, the manufacturing cost of the turntable is high.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a system for manufacturing a side panel of a vehicle, in which a cart may be driven in a frictional contact manner using a friction wheel, instead of driving the cart in a non-contact manner using an existing linear motor to reduce the manufacturing cost due to the elimination of the linear motor and turntable, and a structure in which a cart may be returned up and down may be provided to reduce the installation space.

In an aspect of the present invention, the system for manufacturing a side panel of a vehicle, may include upper running rails and lower running rails, wherein the upper running rails may be disposed upward of the lower running rails with a predetermined distance, to provide a movement path of a cart, the cart having a support frame, a transfer roller mounted on both lateral sides of the support frame, and a friction bar provided at a bottom surface of the support frame, wherein the side panel may be mounted on the cart and the cart moves selectively along the upper running rails and the lower running rails, at least a friction drive unit and at least a friction wheel disposed along the upper and lower running rails wherein the at least a friction drive selectively rotates the at least a friction wheel to move the cart by selectively engaging at least one of the friction wheels with the friction bar of the cart, and an external unit formed separately from the cart on one side of the upper running rails and the lower running rails and supporting an edge portion of the side panel during key welding process.

The cart may include a plurality of support units provided on top of the support frame to support a central portion of the side panel.

The external unit may include a clamping jig having a fixed jig and a rotating jig rotatably mounted on the fixed jig to selectively clamp the edge portion of the side panel, and a jig rotating cylinder coupled to the rotating jig for operating the clamping jig.

The external unit may include a plurality of manifold cylinder modules, in which a plurality of manifold cylinders may be integrated, and wherein the clamping jig and the jig rotating cylinder may be provided on top of each of the manifold cylinders such that the manifold cylinders selectively operate according to the types of the carts for various vehicle models to vary clamping positions of the side panel by using the clamping jigs.

The system may further include a traverse disposed at the other side of the upper and lower running rails, having guide rails selectively coupled to an end of the lower running rails so as to move the cart from the guide rails to the lower running rails after the cart may be transferred from the upper running rails to the lower running rails, guide wheels mounted between the guide rails such that the friction bar of the cart may be selectively engaged between the guide wheels, a first friction wheel selectively engaged with the friction bar of the cart, and an actuator to rotate the first friction wheel.

The traverse may further include a friction bar mounted at the bottom of the guide rails of the traverse to drive the traverse in a lateral direction so as to selectively couple the guide rails to the lower running rails, a second friction wheel engaged with the friction bar of the traverse, an actuator to rotate the second friction wheel to move the traverse in the lateral direction.

The system may further include a drop lifter separately provided at the other end of the upper running rails and the lower running rails to move the cart from the lower running rails to the upper running rails, the drop lifter including a support having vertical members and a horizontal members connecting upper ends of the vertical members, an up-and-down moving frame slidably mounted on the vertical member of the support to move up and down, and guide rails mounted on the up-and-down moving frame and selectively coupled to the upper and lower guide rails according to the movement of the up-and-down moving frame.

The drop lifter further include a friction wheel rotatably mounted to the up-down moving frame and selectively engaged with the friction bar of the cart, and an actuator to rotate the friction wheel.

The system may further include a lifting actuator provided on top of the support to lift or lower the up-and-down moving frame, and a timing belt, in which a midsection of the timing belt surrounds a pulley connected to the lifting actuator, one end of the timing belt may be connected to the up-and-down moving frame, and the other end of the timing belt may be connected to a weight balance to convert a rotational force of the lifting actuator into linear movement and transmits the linear movement to the up-and-down moving frame.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
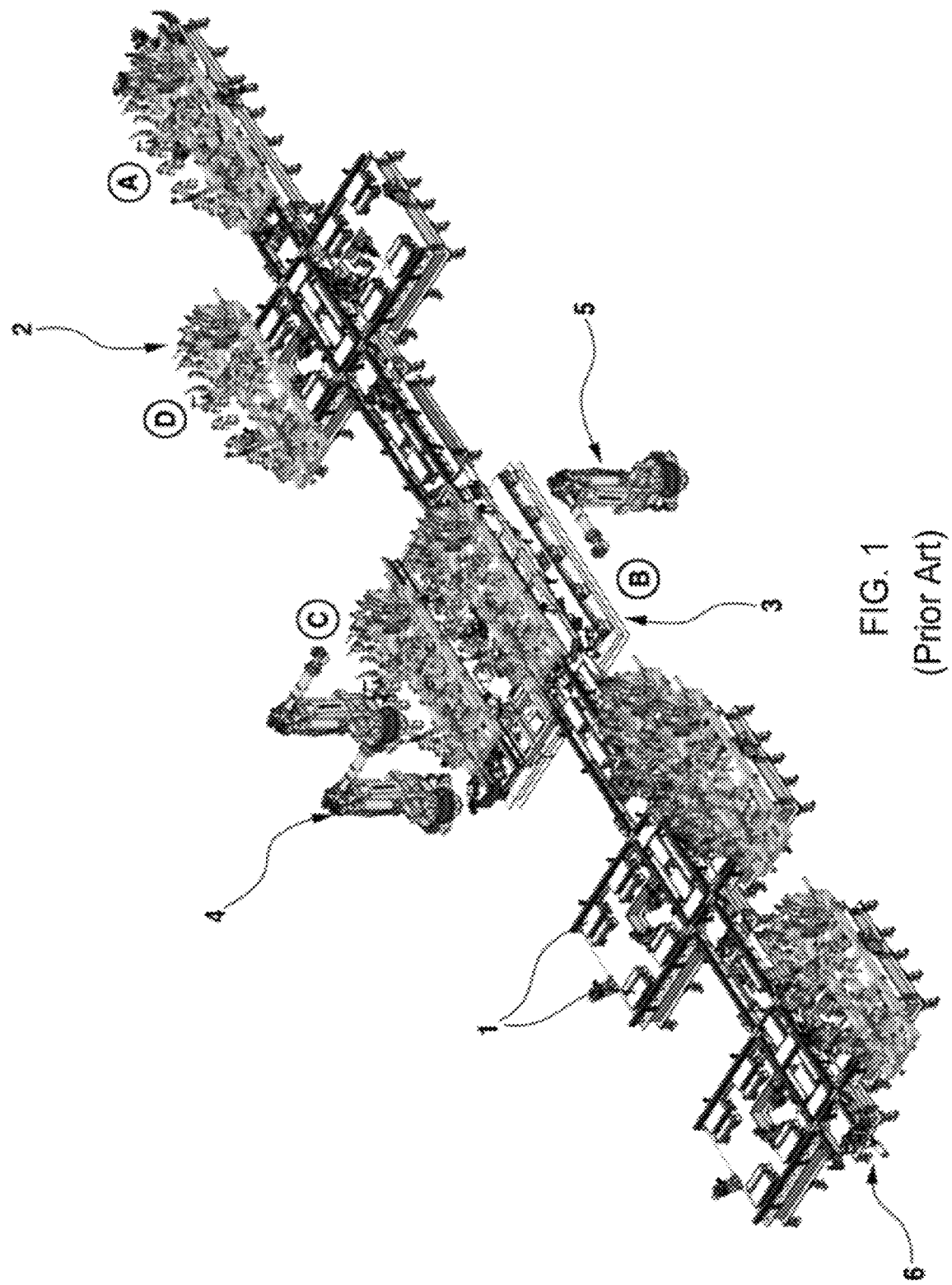
FIG. 1 is a perspective view showing a conventional system for manufacturing a vehicle body panel.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
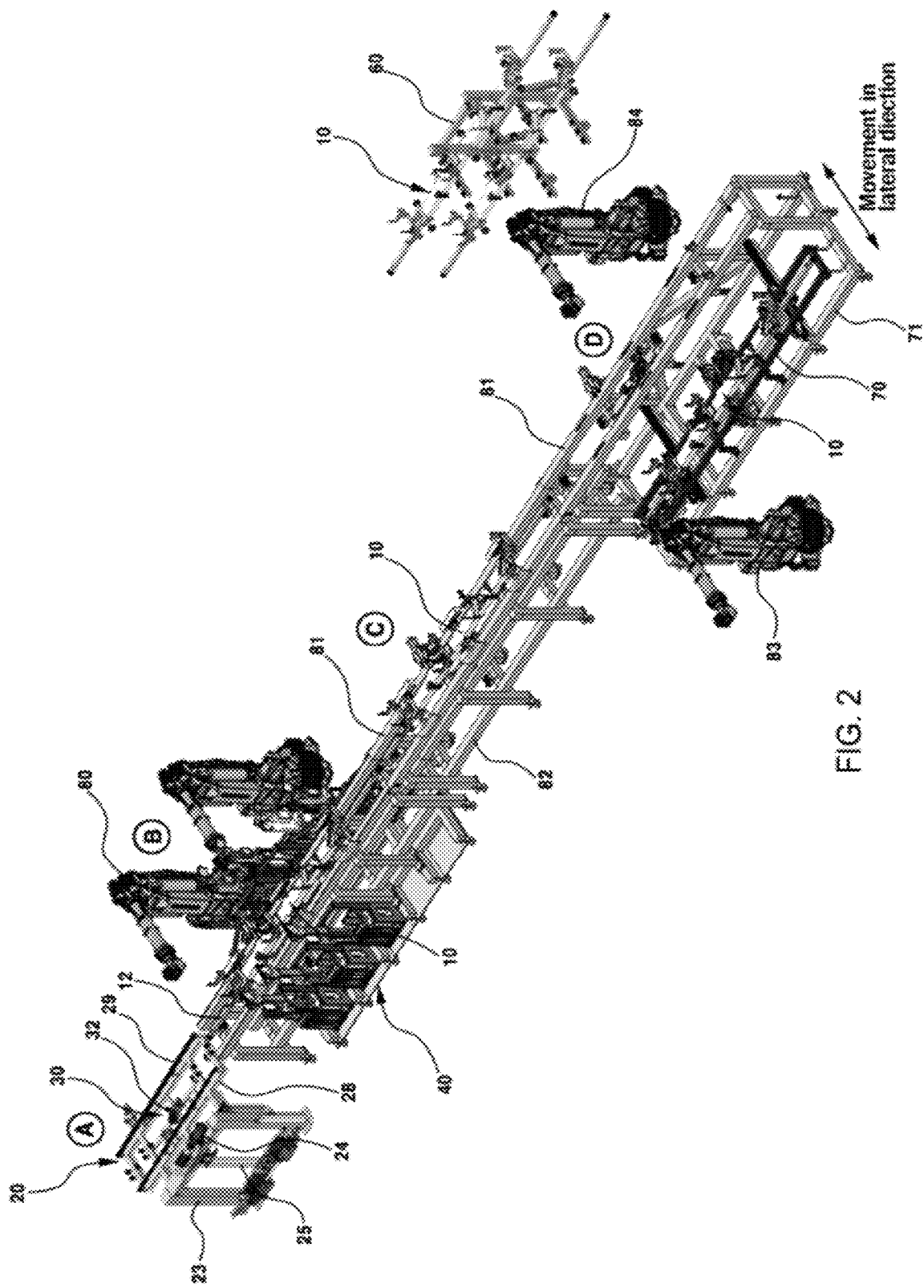
FIG. 2 is a perspective view showing a system for manufacturing a side panel of a vehicle in accordance with an exemplary embodiment of the present invention.

FIG. 2 is a perspective view showing a system for manufacturing a side panel of a vehicle in accordance with an exemplary embodiment of the present invention.

The present invention provides a system for manufacturing a side panel of a vehicle, in which a cart 10, from which pneumatic components and electric/electronic components are substantially eliminated, is driven in a frictional contact manner and the side panel is fixed using a locator of the cart 10 and an external unit 40 during a key welding process to cope with various types of carts for various vehicle models and a structure in which the cart is returned up and down is provided to reduce the manufacturing cost and installation space.

That is, the present invention provides a system for manufacturing a side panel, in which a welding line and a return line are separately configured in view of production efficiency, a side panel 50 is loaded on the cart 10 moving along the welding line disposed at the top and the return line disposed at the bottom such that the side panel 50 is welded during a key welding process and during a respot welding process and then unloaded to the next process.

Typically, the side panel 50 includes an outer panel, an inner panel, and an inner cutter assembly 53. In the figure, while the outer panel and the inner panel are seen as one as they are stacked upon each other, the outer panel and inner panel stacked upon each other are loaded on the cart 10.

The inner cutter assembly 53 is a portion of the side panel 50, which is concavely curved, in which a rear wheel of a vehicle is mounted.

In the side panel manufacturing system, the key welding and respot welding processes are performed to assemble the outer panel, the inner panel, and the inner cutter assembly 53 of the side panel 50.

In the key welding process (B), major parts of the side panel 50 are primarily welded to assemble the outer panel, the inner panel, and the inner cutter assembly 53 of the side panel 50 and, in the respot welding process (C), the remaining portions of the side panel 50, in which the major parts are welded by the key welding process, are secondarily welded.

In other words, the major parts of the outer panel, the inner panel, and the inner cutter assembly 53 of the side panel 50 are temporarily assembled by the key welding process, and then the remaining portions of the outer panel, the inner panel, and the inner cutter assembly 53 of the side panel 50 are welded by the respot welding process and completely fixed.

The side panel manufacturing system of the present invention includes the cart 10 on which the side panel 50 is loaded, a drop lifter 20 disposed at the loading side of the side panel 50 to move the cart 10, the welding line and the return line, which are disposed at the top and bottom, respectively, and a traverse 70 and a cart support stand 60, which are provided at the bottom of the unloading side of the side panel 50 to change the cart 10 according to the vehicle model.

Figure 3:
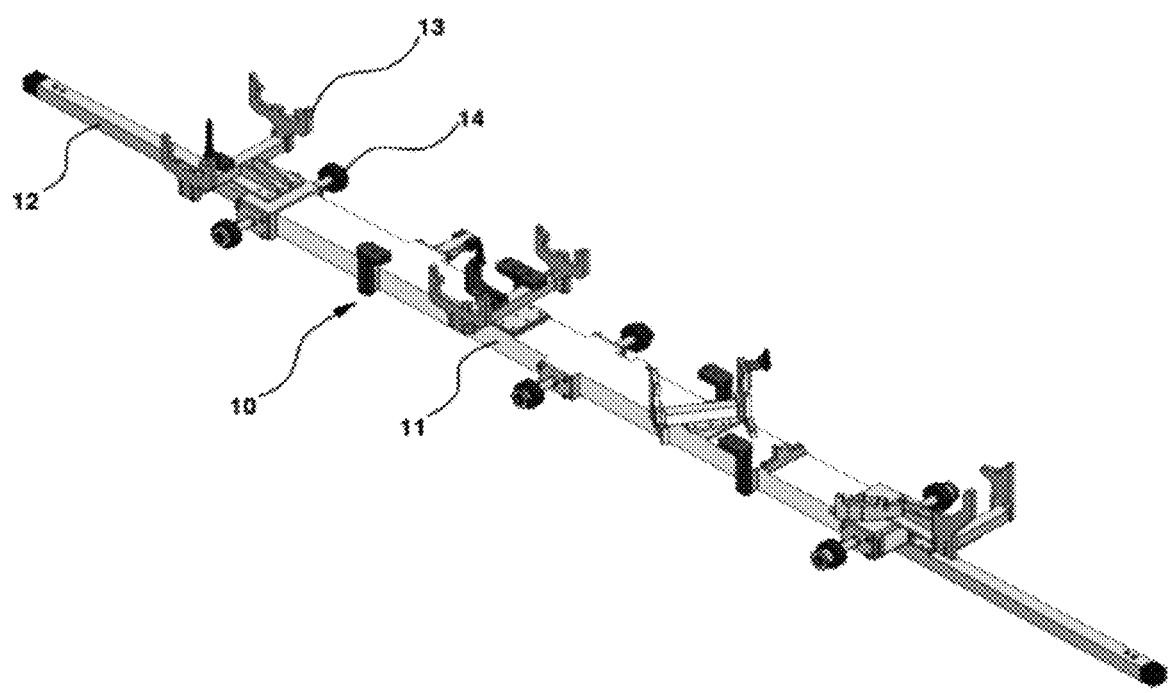
FIG. 3 is a perspective view of a cart of FIG. 2.

FIG. 3 is a perspective view of the cart 10 of FIG. 2.

According to the cart 10 as an exemplary embodiment of the present invention, from which pneumatic components and electric/electronic components are substantially eliminated, it is possible to minimize the size of the cart 10 and reduce the number of parts and the cost.

Moreover, the cart 10 includes a support frame 11 which serves as a body, a friction bar 12 connected to the bottom of the support frame 11 to move the support frame 11 by frictional contact, jig units mounted to support a central portion of the side panel 50, and transfer rollers 14 rotatably mounted on both sides of the support frame 11 with respect to a hinge shaft to smoothly move the cart 10.

The support frame 11 has a rectangular shape with a small width, and each of the jig units includes a connecting bar provided on the upper side of the support frame 11 in the width direction (i.e., in a direction perpendicular to the friction bar 12) and a support member having a substantially Y-shape and erected at both ends of the connecting bar to support the central portion of the side panel 50.

Here, the jig units support the bottom of the central portion of the side panel 50 by the support member, and the shape of the support member may vary according to various shapes of the size panels 50 for various vehicle models. Moreover, the arrangement direction of the connecting bar may vary according to the form of the side panel 50.

In other words, the cart 10 as an exemplary embodiment of the present invention is configured to match the side panels 50 having various sizes and shapes according to the vehicle models, and the structure of the cart 10 is simplified by substantially eliminating the existing pneumatic components and electric/electronic components and mounting the jig units for supporting only the central unit of the side panel 50 to the support frame 11.

The friction bar 12 is provided at the bottom of the support frame 11 in the forward and backward direction to apply a frictional force generated by contact with a friction wheel 32, provided in the welding line and the return line, respectively, such that the cart 10 moves. Moreover, the friction bar 12 serves to control the acceleration and deceleration of the cart 10.

Figure 4:
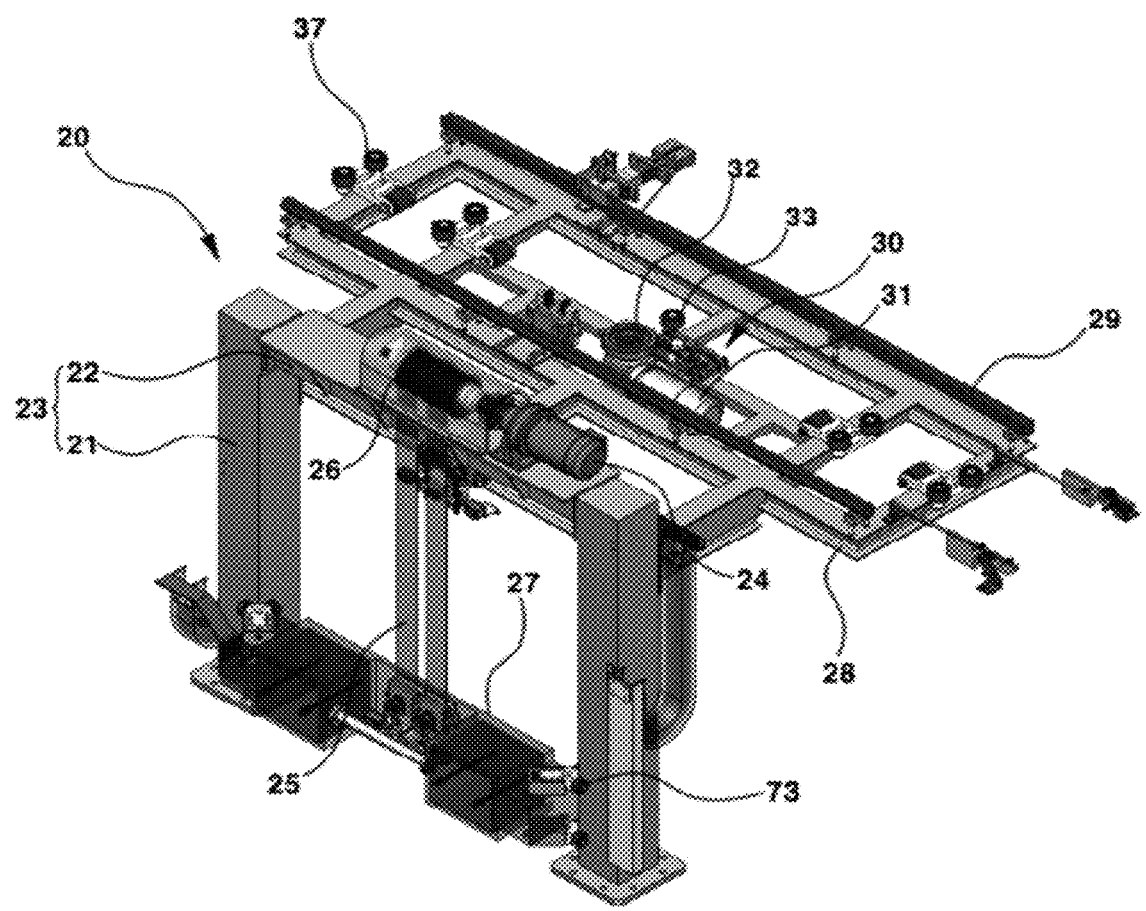
FIG. 4 is a perspective view of a drop lifter of FIG. 2.

FIG. 4 is a perspective view of the drop lifter 20 of FIG. 2.

The drop lifter 20 moves up and down to lift the cart 10 from the return line to the welding line. That is, the drop lifter 20 receives the cart 10 returned to the return line, moves upward to move the cart 10 to the welding line, and is then returned to its original position.

The drop lifter 20 includes an up-and-down moving frame 28 on which guide rails 29 are provided in parallel to each other, a support 23 for supporting the up-and-down moving frame 28 to move up and down, and a lifting means for raising and lowering the up-and-down moving frame 28.

Moreover, the up-and-down moving frame 28 includes a friction drive unit 30 for driving the cart 10 horizontally by frictional force and a plurality of guide wheels 37 which are rotated by contact with the friction bar 12 to smoothly move the friction bar 12.

The support 23 includes a pair of vertical members 21 erected vertically, to which the up-and-down moving frame 28 is mounted to move up and down, and a horizontal member 22 connecting the upper ends of the vertical members 21.

The lower end of each vertical member 21 is fixed to the ground by means of a bolt, and a connecting frame extending from one side of the up-and-down moving frame 28 in the width direction is connected to the vertical member 21 of the support 23 to slide up and down.

Here, the up-and-down moving frame 28 of the drop lifter 20 is mounted on the vertical member 21 of the support 23 to move up and down in a cantilever manner, which reduces the number of components for supporting the up-and-down moving frame 28, thereby further simplifying the structure of the drop lifter 20 and reducing the installation cost.

The lifting member includes a lifting motor 24 provided on top of the horizontal member 22, a pair of timing belts 25 transmitting the rotational force of the lifting motor 24, and a pair of weight balances 27 for adjusting the weight and balance of the up-and-down moving frame 28.

A pulley 26 is rotatably mounted on an output shaft of the lifting motor 24. The midsection of each timing belt 25 surrounds the pulley 26, one end of the timing belt 25 is connected to one side of the up-and-down moving frame 28, and the other end of the timing belt 25 is connected to the weight balance 27.

The weight balances 27 are provided at the bottom of the vertical member 21 on the opposite side of the up-and-down moving frame 28, and a guide roller 73 is provided on both sides of each weight balance 27 to guide the up-and-down movement of the weight balances 27.

When the lifting motor 24 rotates in one direction, the pulley 26 rotates such that the up-and-down moving frame 28 connected to the one end of the timing belts 25 is raised and the weight balances 27 connected to the other end of the timing belts 25 are lowered. On the contrary, when the lifting motor 24 rotates in the other direction, the pulley 26 rotates such that the up-and-down moving frame 28 connected to the one end of the timing belts 25 is lowered and the weight balances 27 connected to the other end of the timing belts 25 are raised.

In other words, the up-and-down moving frame 28 and the weight balances 27 are connected to both ends of the timing belts 25 and moved up and down by the pulley 26.

Figure 5:
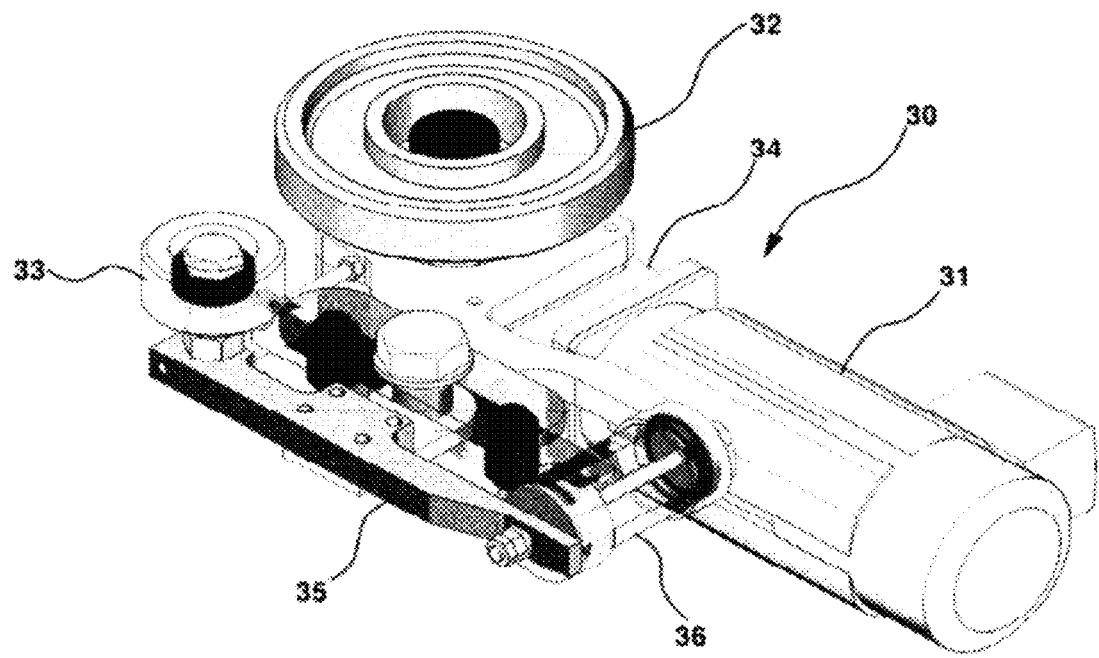
FIG. 5 is a perspective view of a friction drive unit of FIG. 2.

FIG. 5 is a perspective view of the friction drive unit 30 of FIG. 2.

The friction drive unit 30 moves the cart 10 loaded on the drop lifter 20 to the welding line or moves the cart 10 from the return line to the drop lifter 20 by contact with the friction bar 12 of the cart 10.

The friction drive unit 30 includes an induction motor 31 including a decelerator 34, a friction wheel 32 connected to the inside of the decelerator 34 by a rotating shaft and being in contact with one side of the friction bar 12, and an idle wheel 33 being in contact with the opposite side of the friction bar 12.

Here, the idle wheel 33 should have a predetermined interval from the friction wheel 32 to match the width of the friction bar 12 such that the friction wheel 32 is in complete contact with the friction bar 12.

To maintain the predetermined interval between the friction wheel 32 and the idle wheel 33, the idle wheel 33 may be rotatably provided on a hinge member 35 with respect to a hinge pin, and one end of the hinge member 35 may be elastically supported by a spring 36.

A bolt is provided at the one end of the hinge member 35 to penetrate the spring 36 and a nut is fastened to the bolt. Therefore, when the one end of the hinge member 35 is retracted by adjusting the bolt and nut, the interval of the idle wheel 33, provided at the other end the hinge member 35, from the friction wheel 32 is increased. On the contrary, when the one end of the hinge member 35 is opened by adjusting the bolt and nut, the interval of the idle wheel 33, provided at the other end the hinge member 35, from the friction wheel 32 is reduced. That is, the interval between the friction wheel 32 and the idle wheel 33 can be controlled by adjusting the bolt and nut.

As such, the friction wheel 32 and the idle wheel 33 are in smooth contact with the friction bar 12 due to the elastic force of the spring 36 by adjusting the bolt and nut, and thus the rotational force of the induction motor 31 is transmitted to the friction bar 12 through the friction wheel 32 and the idle wheel 33, which allows the horizontal movement of the cart 10.

Here, the rotation of the induction motor 31 can be controlled in the forward and reverse directions. Therefore, when the induction motor 31 rotates in one direction, the rotational force is transmitted to the friction wheel 32 through the decelerator 34, and thus the friction wheel 32 rotates to move the friction bar 12 being in contact with the friction wheel 32 from the drop lifter 20 to the welding line.

On the contrary, when the induction motor 31 rotates in the other direction, the rotational force is transmitted to the friction wheel 32 through the decelerator 34, and thus the friction wheel 32 rotates to move the friction bar 12 being in contact with the friction wheel 32 from the return line to the drop lifter 20.

Therefore, in an exemplary embodiment of the present invention, the cart 10 is moved to each process in a frictional contact manner, and thus it is possible to reduce the number of linear motors and the capacity of inverters for controlling the linear motors, which results in a reduction in cost, compared to the conventional non-contact type system. Moreover, it is possible to accurately and rapidly control the moving speed of the cart 10 by the physical contact between the friction wheel 32 and the friction bar 12 under the control of the induction motor 31.

The welding line and the return line may be implemented as a straight structure by upper running rails 81 and lower running rails 82, respectively. The upper running rails 81 and lower running rails 82, which are disposed horizontally at the top and bottom, respectively, are connected and supported by the support member.

The key welding process and the respot welding process are performed on the upper running rails 81. The drop lifter 20 is connected to the loading side for the side panel 50 at one end of the welding line and the return line, and the side panel 50 is unloaded at the other end of the welding line. Moreover, the traverse 70 is provided at the other end of the return line to move in the width direction of the lower running rails 82 to change the cart 10.

Here, the friction drive unit 30 is provided in the key welding process, the respot welding process, and the unloading process of the welding line, respectively, to move the cart 10 along the welding line by frictional contact with the friction bar 12 of the cart 10.

The external unit 40, configured separately from a plurality of welding robots 80 and the upper running rails 81, is provided in the key welding process of the welding line to perform the key welding process.

Figure 6:
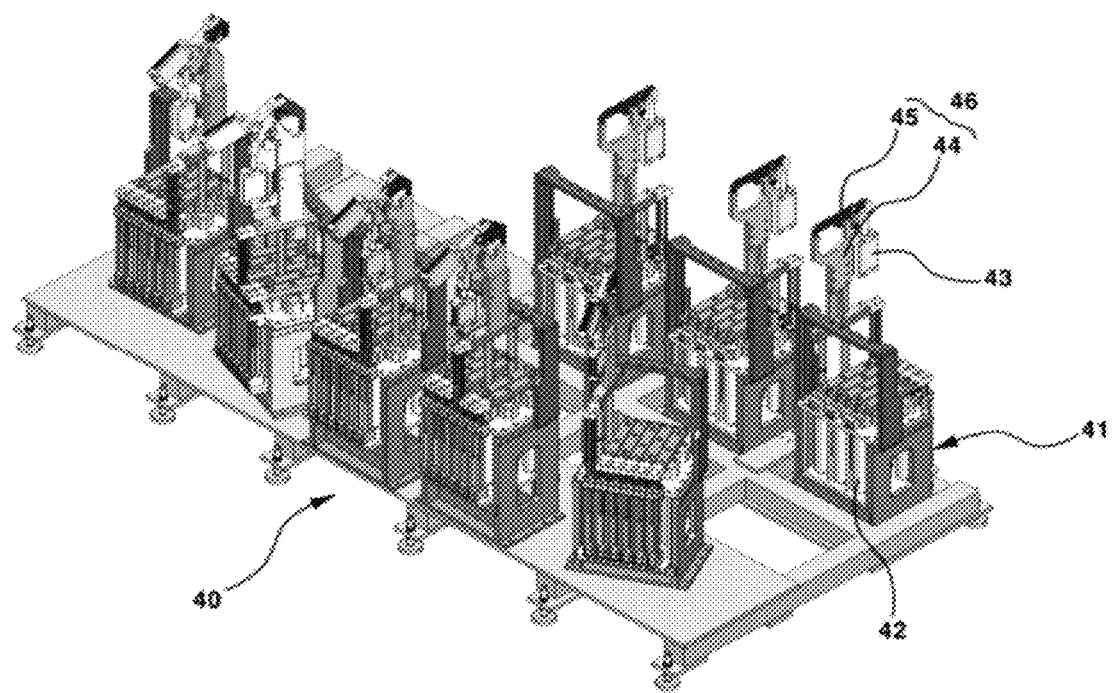
FIG. 6 is a perspective view of an external unit of FIG. 2.
Figure 7:
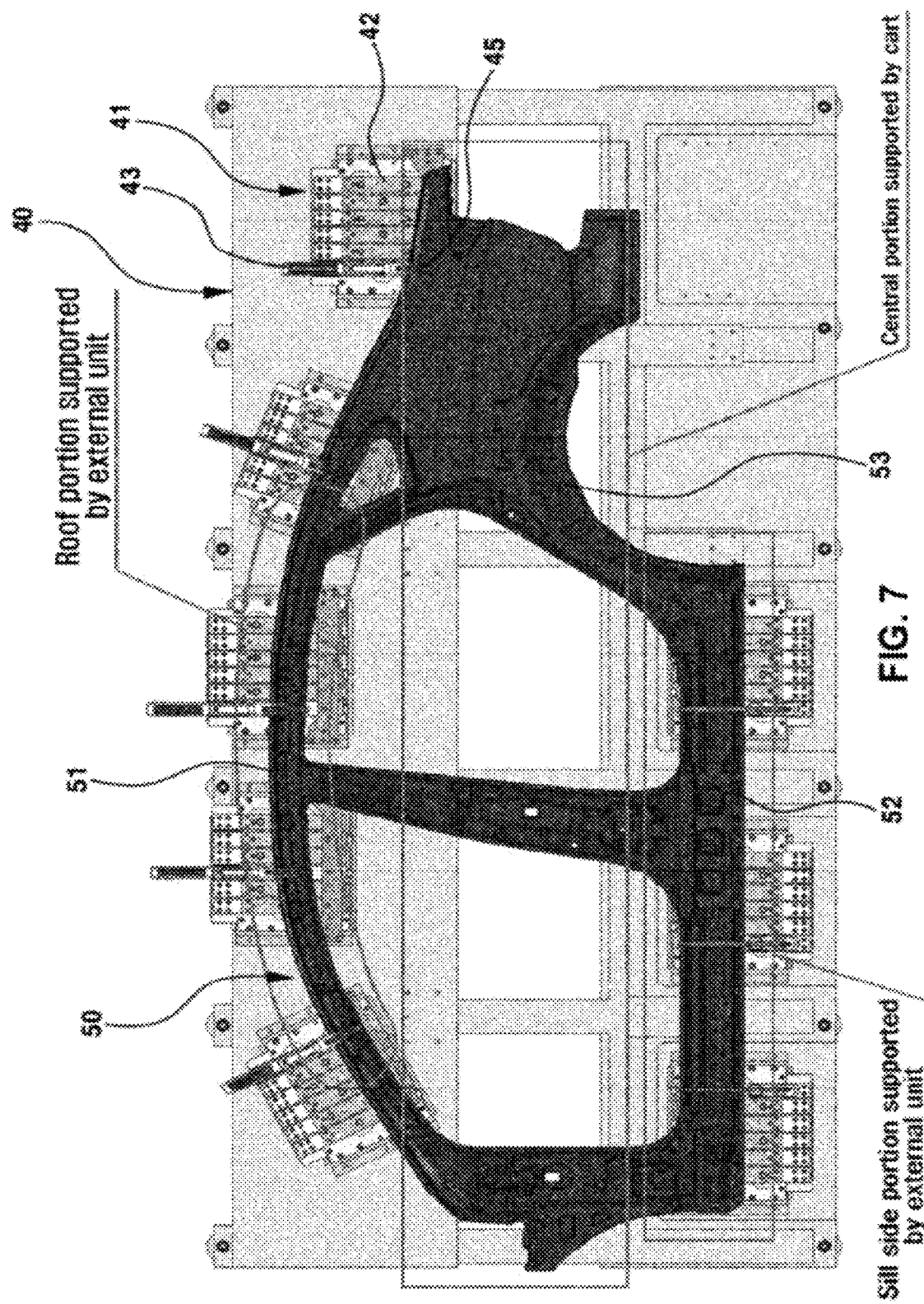
FIG. 7 is a plan view showing that a side panel is supported by an external unit of FIG. 2.

FIG. 6 is a perspective view of the external unit 40 of FIG. 2, and FIG. 7 is a plan view showing that the side panel 50 is supported by the external unit 40.

The external unit 40 supports an edge portion of the side panel 50, i.e., a roof portion 51 connected to a roof panel and a sill side portion 52 connected to the side of a floor panel, together with the cart 10 during the key welding process.

In other words, during the key welding process, the major parts connecting the inner panel and the outer panel are first welded because the inner panel and the outer panel of the side panel 50 are not welded. Therefore, during the key welding process, the central portion of the side panel 50 should be supported by a plurality of support units 13 of the cart 10, and further the edge portion of the side panel 50 should be supported by the external unit 40, thereby firmly fixing the side panel 50.

The external unit 40 includes a plurality of manifold cylinder modules 41 mounted on top of a base frame to cope with various types of side panels 50 for various vehicle models.

Each of the manifold cylinder modules 41 includes six manifold cylinders 42 inserted and mounted therein and a clamping jig 46 rotatably mounted on top of each of the manifold cylinders 42 by a supporter to be closed and opened, the six manifold cylinders and the clamping jigs 46 being integrated into a module.

A total of eight manifold cylinder modules 41 are provided, in which five manifold cylinder modules 41 clamp five points of the roof portion 51 of the side panel 50, and the remaining three manifold cylinder modules 41 clamp three points of the sill side portion 52 of the side panel 50.

To clamp the roof portion 51 and the sill side portion 52 of the side panel 50, the manifold cylinders 42 of each manifold cylinder module 41 selectively move up and down according to the sizes and shapes of the side panels 50 for various vehicle models. The clamping jig 46 is supported on top of each of the manifold cylinders 42 and rotated by a jig rotating cylinder 43 mounted at one end of the clamping jig 46 to clamp the edge portion of the side panel 50.

In the figures, while one clamping jig 46 is provided on one of the six manifold cylinders 42 in each of the manifold cylinder modules 41, the clamping jig supporter and the clamping jig 46 are substantially provided on top of each of the six manifold cylinders 42.

Moreover, the bottom of the clamping jig support is connected to a piston rod of the manifold cylinder 42 by a supporting bar and is moved up and down by the operation of the manifold cylinder 42.

The clamping jig 46 includes a fixed jig 44 assembled at the top of the supporter and a rotating jig 45 rotatably connected to the top of the fixed jig 44 by a hinge link. The rear end of the rotating jig 45 is connected to a piston rod of the jig rotating cylinder 43 such that the clamping jig 46 is closed and opened by the operation of the jig rotating cylinder 43, thereby clamping the edge portion of the side panel 50.

Here, since the roof portion 51 of the side panel 50 has a curved shape and the sill side portion 52 of the side panel 50 has a straight shape, the manifold cylinder modules 41 are arranged in accordance with the shapes.

As such, the external unit 40 selectively operates the plurality of clamping jigs 46 by selectively operating the manifold cylinders 42, and thus it is possible to vary the clamping positions in accordance with the shapes of the side panels 50 for various vehicle models to actively cope with the carts 10 for various vehicle models.

For example, first and second manifold cylinder modules 41, located in the first and second positions from the right, among the manifold cylinder modules 41 which clamp the sill side portion 52 of the side panel 50, raise a sixth manifold cylinder 42, located in the sixth position from the right, and a third manifold cylinder module 41, located in the third position from the right, raises a first manifold cylinder 42.

Moreover, even in the case of the manifold cylinder modules 41 which clamp the roof portion 51 of the side panel 50, the plurality of clamping jigs 46, which move up and down in each manifold cylinder module 41, are selectively operated by selectively operating the manifold cylinders 42, thereby varying the clamping positions.

Meanwhile, an unloading robot 83, a cart changing robot 84, and a cart support stand 60 are provided at the opposite end of the welding line.

Figure 8:
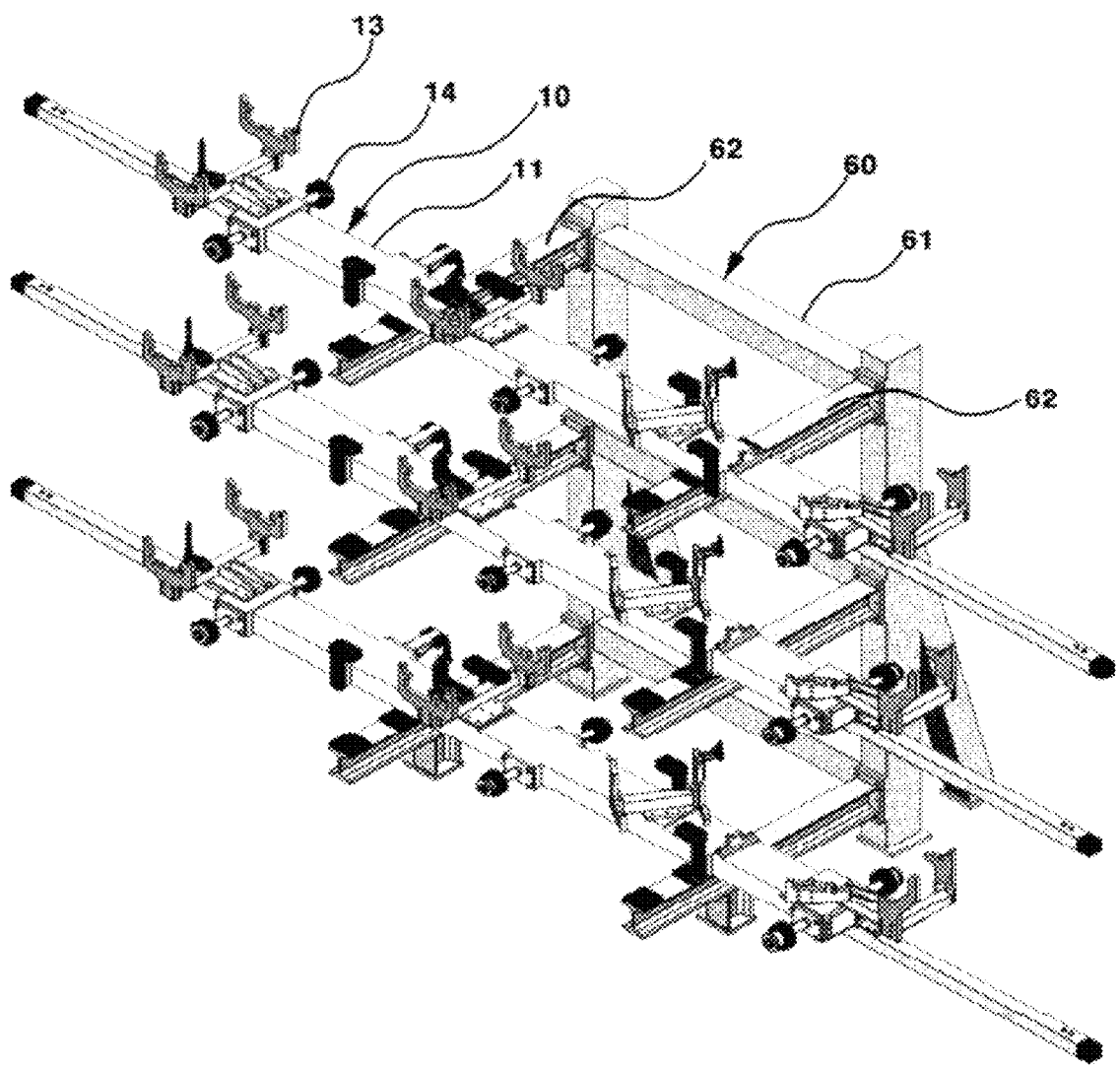
FIG. 8 is a perspective view showing that carts for various vehicle models are supported on a cart support stand of FIG. 2.

FIG. 8 is a perspective view showing that carts for various vehicle models are supported on the cart support stand 60 of FIG. 2.

The side panel 50 upon completion of the welding process is unloaded by the unloading robot 83 provided at one side of the welding line and transferred to the next process. If necessary, a cart 10 for another vehicle model placed on the cart support stand 60 is changed by the cart changing robot 84 provided at the other side of the welding line.

The car support stand 60 includes a rectangular frame 61 arranged vertically and support bars 62 projecting from both sides of the rectangular frame 61 in three stages. Therefore, the carts 10 for various vehicle models can be loaded up and down in three stages, which is advantageous in terms of space utilization.

The cart 10 supported on the cart support stand 60 can be changed by the cart changing robot 84, and thus a separate device for changing the cart 10 is not required in the cart support stand 60. Therefore, the structure of the cart support stand 60 is very simple and economical.

The cart changing robot 84 picks up another cart 10 from the cart support stand 60 and puts it on top of the traverse 70, thus changing the cart 10.

Figure 9:
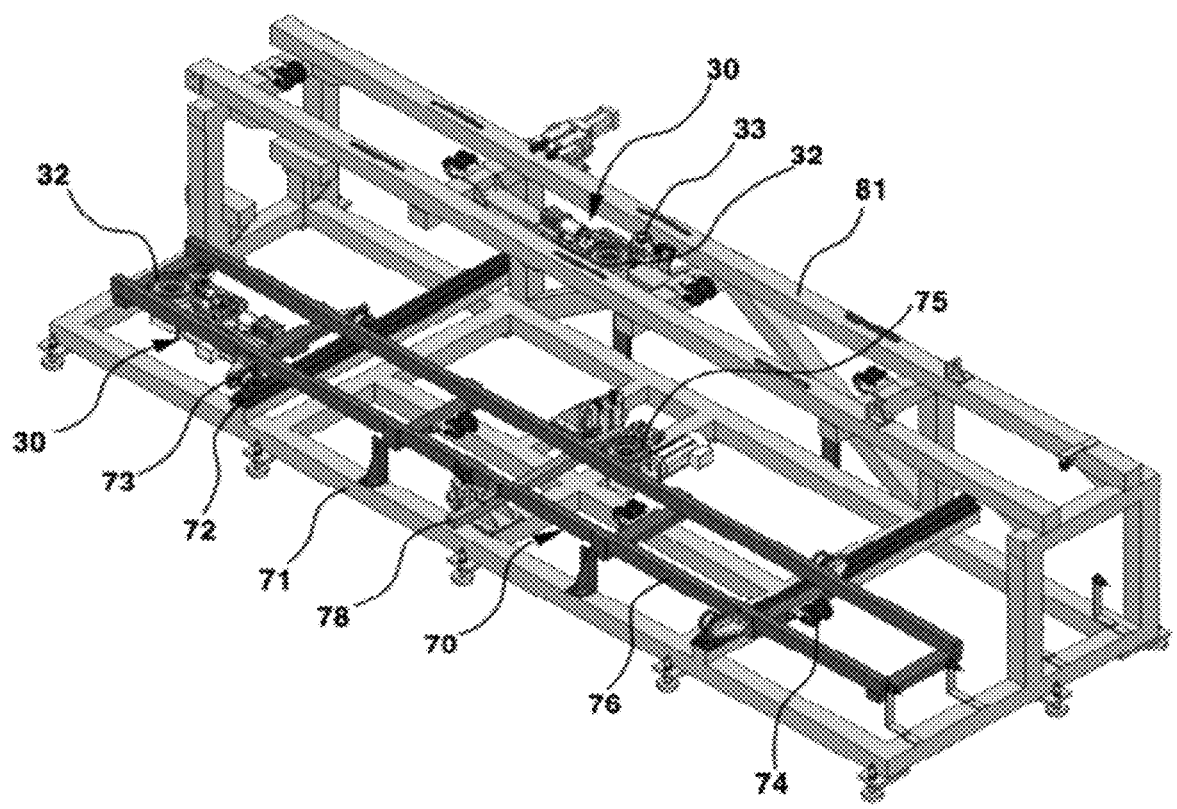
FIG. 9 is a perspective view of a traverse of FIG. 2.

FIG. 9 is a perspective view of the traverse 70 of FIG. 2.

A traverse support frame 71 is integrally formed on the opposite end of the return line. The traverse support frame 71 has a width greater than that of the lower running rails 82 of the return line, the width of the traverse support frame 71 extending in the lateral direction, such that the cart changing robot 84 can load the cart 10 on the traverse 70 without interference with the upper running rails 81 of the welding line.

The traverse 70 includes guide rails 76 such that the transfer rollers 14 of the cart 10 are in contact with the upper side of the guide rails 76 to rotatably move in the forward and reverse directions and guide rollers 73 mounted at the bottom of the guide rails 76 by means of a connecting bracket.

The guide rollers 73 rotatably move along LM ("Linear Motion") guides 72 provided on top of the traverse support frame 71 in parallel to each other in the lateral direction such that the traverse 70 can move on the traverse support frame 71 in the lateral direction.

Moreover, guide wheels 74 are mounted between the guide rails 76 of the traverse 70 by means of a connecting bar and the friction bar 12 of the cart 10 is inserted between the guide wheels 74 such that the friction bar 12 of the cart 10 can be slidably supported by the guide wheels 74.

A friction drive unit is further provided on the traverse support frame 71 to have substantially the same configuration as the friction drive unit 30 as a cart drive means provided on the up-and-down moving frame 28. Therefore, when an induction motor 31 of the friction drive unit 30 is driven to rotate a friction wheel 75, the friction wheel 75 of the friction drive unit 30 is in frictional contact with a friction bar 78 provided at the bottom of the traverse 70 in the width direction, thereby moving the traverse 70 in the lateral direction.

Moreover, the traverse 70 moves the cart 10 loaded by the cart changing robot 84 to the lower running rails 82 of the return line and, at this time, the cart 10 is moved to the return line by frictional contact with the friction wheel 32 using the friction drive unit 30 having the same configuration as the cart drive means.

The operation flow of the system for manufacturing the side panel 50 according to an exemplary embodiment of the present invention having the above-described configuration will be described below.

First, the side panel 50 including the outer panel and the inner panel, which are stacked upon each other, is loaded on the cart 10 standing by on top of the drop lifter 20 by a loading robot.

When the side panel 50 is loaded on the cart 10, the lifting motor 24 operates to rotate the pulley 26 such that the timing belts 25 surrounding the pulley 26 move up and down. Then, the up-and-down moving frame 28 connected on one end of the timing belts 25 is raised and the weight balances 27 connected to the other end of the timing belts 25 are lowered such that the cart 10 is lifted by the drop lifter 20.

When the up-and-down moving frame 28 is completely raised, the guide rails 29 of the up-and-down moving frame 28 are on a straight line with the upper running rails 81 of the welding line, and the friction drive unit 30 mounted on the up-and-down moving frame 28 operates to enter the cart in the welding line.

For example, when the induction motor 31 of the friction drive unit 30 is driven, the rotational force of the induction motor 31 is transmitted to the friction wheel 32 through the decelerator 34, and thus the friction wheel 32 rotates such that the friction bar 12 of the cart 10 being in contact with the friction wheel 32 is moved by the frictional force to enter the cart 10 in the welding line.

After moving the cart 10 to the welding line, the up-and-down moving frame 28 of the drop lifter 20 is lowered to its original position and stands by the cart 10 to be returned to the return line.

Subsequently, the major parts of the side panel 50 loaded on the cart 10 and moved to the welding line are temporarily assembled by the key welding process.

Here, since the outer panel and the inner panel of the side panel 50 loaded on the cart 10 are not welded before the key welding process, the central portion and the edge portion of the side panel 50 are supported and clamped by the support units 13 of the cart 10 and the clamping jigs 46 of the external unit 40 to firmly fix the side panel 50 during the key welding process.

Each of the support units 13 of the cart 10 includes the support members having various shapes and structures according to the vehicle models to support all around the central portion of the side panel 50. At the same time, the clamping jigs 46 of the external unit 40 provided in the welding line (B) for the key welding process are closed and opened by the operation of the manifold cylinder modules 41 to clamp the roof portion 51 and the sill side portion 52, which are the edge portion of the side panels 50, thereby firmly fixing the side panel 50 during the key welding process.

During the key welding process (B), the central portion and the edge portion of the side panel 50 are simultaneously supported by the support units 13 of the cart 10 and the clamping jigs 46 of the external unit 40 to firmly fix the side panel 50, and then the major parts of the side panel 50 are welded by the welding robot 80.

Then, the side panel 50 temporarily welded during the key welding process is moved to the respot welding process (C).

Here, the cart 10 is moved by the friction drive unit 30 provided on the upper running rails 81 of the welding line during the key welding process (B).

During the respot welding process (C), the remaining portions of the side panel 50 are continuously welded along the edge portion after the key welding process to completely fix the outer panel and the inner panel of the side panel 50.

Subsequently, the side panel 50 completely assembled during the respot welding process is moved to the unloading process.

Here, the cart 10 is moved by the friction drive unit 30 provided on the upper running rails 81 of the welding line during the respot welding process (C).

During the unloading process, the completed welded side panel 50 is raised by the unloading robot 83 and transferred to the next process.

Meanwhile, when the side panel 50 for a new vehicle model is to be welded, the cart changing robot 84 changes the cart 10 for the previous vehicle model to a cart 10 for the new vehicle model.

For example, the cart changing robot 84 raises the cart 10 for the previous vehicle model placed on top of the upper running rails 81 and stores the corresponding cart 10 in an empty place of the cart support stand 60. Then, the cart changing robot 84 raises the cart 10 for the new vehicle model and places the corresponding cart 10 on the upper running rails 81.

Next, to prevent interference during loading of the new cart 10, the traverse 70 projects from the lower running rails 82 of the return line in the lateral direction to stand by the cart for the new vehicle model, and the unloading robot 83 loads the cart 10 for the new vehicle model placed on the upper running rails 81 to the top of the traverse 70.

When the cart 10 for the new vehicle model is loaded on the traverse 70, the friction bar 12 of the cart 10 is inserted between the friction wheel 75 of the traverse 70 and an idle wheel 33 of the friction drive unit 30 provided on the traverse support frame 71.

Here, the traverse support frame 71 projects to both sides in the lateral direction such that the traverse 70 can move to both sides in the lateral direction. Therefore, the cart 10 for the new vehicle model can be loaded directly on the traverse 70 by the cart changing robot 84.

Then, the traverse 70 is moved in the lateral direction to be on a straight line with the lower running rails 82, and the cart 10 is moved to the lower running rails 82 of the return line.

At this time, the friction bar 78 of the traverse 70 is in frictional contact with the friction wheel 32 of the friction drive unit 30 provided on the traverse support frame 71, and the induction motor 31 of the friction drive unit 30 is driven to rotate the friction wheel 75. As a result, the traverse 70 is moved in the lateral direction by the frictional force of the friction wheel 75 and the friction bar 78.

Subsequently, the friction drive unit 30 of the traverse 70 is driven such that the cart 10 is moved along the return line by frictional contact between the friction wheel 32 and the friction bar 12 of the cart 10.

Next, after the cart 10 returned along the return line is moved to the drop lifter 20, which stands by the cart 10 at one end of the lower running rails 82 of the return line, a new side panel 50 is loaded on the cart 10, and the drop lifter 20 is raised to repeatedly perform the welding process.

As described above, the system for manufacturing the side panel of the vehicle according to an exemplary embodiment of the present invention has the following advantages.

The existing pneumatic components and electric/electronic components are substantially eliminated from the cart, and the jig units are provided to the cart to support only the central portion of the side panel. Therefore, it is possible to significantly reduce the size of the cart and minimize the structure of the cart, thereby reducing the manufacturing cost and installation cost of the cart.

The cart is driven in a frictional contact manner using the friction wheel, and thus it is possible to solve the problems caused when the cart is driven in a non-contact manner.

The friction wheel is formed of a urethane material to maximize the coefficient of friction and increase the frictional force, and thus it is possible to control the acceleration and deceleration of the cart by frictional contact with the friction bar of the cart.

The central portion of the side panel is supported by the cart and, at the same time, the edge portion of the side panel is clamped by the external unit during key welding, and thus it is possible to firmly fix the side panel during welding. Moreover, the clamping jigs of the external unit are selectively operated by selectively operating the plurality of manifold cylinders, and thus the clamping positions can vary according to the types of the side panels for various vehicle models. Therefore, it is possible to actively cope with various types carts for various vehicle models.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for manufacturing a side panel of a vehicle, the system comprising:
   upper running rails and lower running rails, wherein the upper running rails are disposed upward of the lower running rails with a predetermined distance, to provide a movement path of a cart;
   the cart having:
      a support frame;
      transfer rollers mounted on both lateral sides of the support frame; and
      a first friction bar provided at a bottom surface of the support frame;
      wherein the side panel is mounted on the cart and the cart moves selectively along the upper running rails and the lower running rails;
   a first friction drive unit having a first friction wheel disposed along the upper running rails;
   wherein the first friction drive unit selectively rotates the first friction wheel to move the cart by selectively engaging the first friction wheel with the first friction bar of the cart; and
   an external unit formed separately from the cart on a lateral side of the upper running rails and the lower running rails and supporting an edge portion of the side panel during key welding process on the upper running rails;
   wherein the external unit includes:
      a clamping jig having a fixed jig and a rotating jig rotatably mounted on the fixed jig to selectively clamp the edge portion of the side panel; and
      a jig rotating cylinder coupled to the rotating jig for operating the clamping jig; and
   wherein the external unit includes a plurality of manifold cylinder modules, in which a plurality of manifold cylinders are integrated, and wherein the clamping jig and the jig rotating cylinder are provided on top of each of the manifold cylinders such that the manifold cylinders selectively operate according to types of the carts for various vehicle models to vary clamping positions of the side panel by using the clamping jigs.

2. The system of claim 1, wherein the cart includes a plurality of support units Provided on top of the support frame to support a cetral portion of the side panel.

3. The system of claim 1, further including a drop lifter separately provided at one end of the upper running rails and the lower running rails to move the cart from the lower running rails to the upper running rails, the drop lifter including:
   a support having vertical members and horizontal members connecting upper ends of the vertical members;
   an up-and-down moving frame slidably mounted on the vertical member of the support to move up and down; and
   guide rails mounted on the up-and-down moving frame and selectively coupled to the upper and lower guide rails according to a movement of the up-and-down moving frame.

4. The system of claim 3, wherein the drop lifter further includes:
   a fourth friction wheel rotatably mounted to the up-and-down moving frame and selectively engaged with the first friction bar of the cart; and
   an actuator to rotate the fourth friction wheel of the dropper lifter.

5. The system of claim 4, further including:
   a lifting actuator provided on top of the support to lift or lower the up-and-down moving frame; and
   a timing belt, in which a midsection of the timing belt surrounds a pulley connected to the lifting actuator, one end of the timing belt is connected to the up-and-down moving frame, and the other end of the timing belt is connected to a weight balance to convert a rotational force of the lifting actuator into a linear movement and transmits the linear movement to the up-and-down moving frame.

6. The system of claim 1, further including a traverse disposed at one side of the upper and lower running rails opposite the external unit, having:
   guide rails selectively coupled to an end of the lower running rails so as to move the cart from the guide rails to the lower running rails;
   guide wheels mounted between the guide rails such that the first friction bar of the cart is selectively engaged between the guide wheels;
   a second friction wheel selectively engaged with the first friction bar of the cart; and
   an actuator to rotate the second friction wheel.

7. The system of claim 6, wherein the traverse further includes:
   a second friction bar mounted at a bottom of the guide rails of the traverse to drive the traverse in a lateral direction so as to selectively couple the guide rails to the lower running rails;
   a third friction wheel engaged with the second friction bar of the traverse;
   an actuator to rotate the third friction wheel to move the traverse in the lateral direction.

* * * * *